Oct. 17, 1939.　　G. H. BROWN ET AL　　2,176,120
APPARATUS FOR MEASURING PHASE ANGLES
Filed March 19, 1937　　2 Sheets-Sheet 1
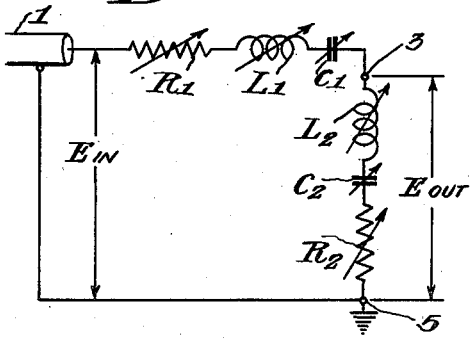
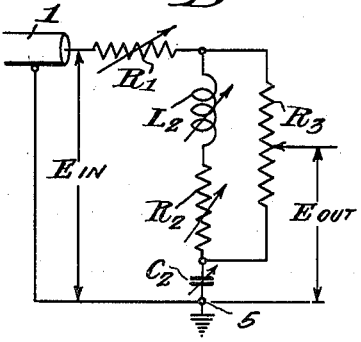
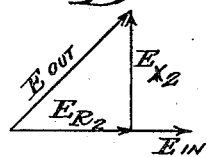
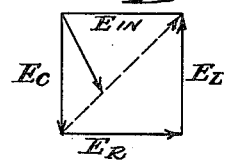
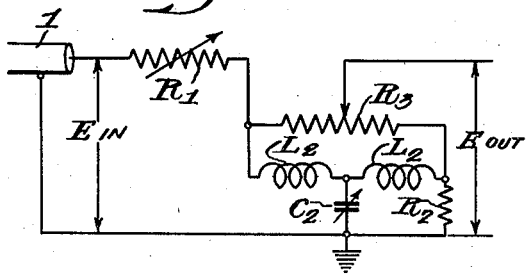
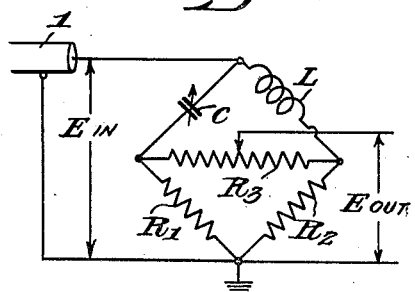
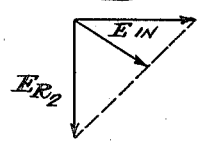
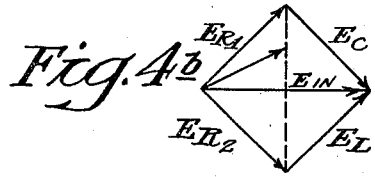
Inventors
GEORGE H. BROWN
WINFIELD R. KOCH
By
Attorney

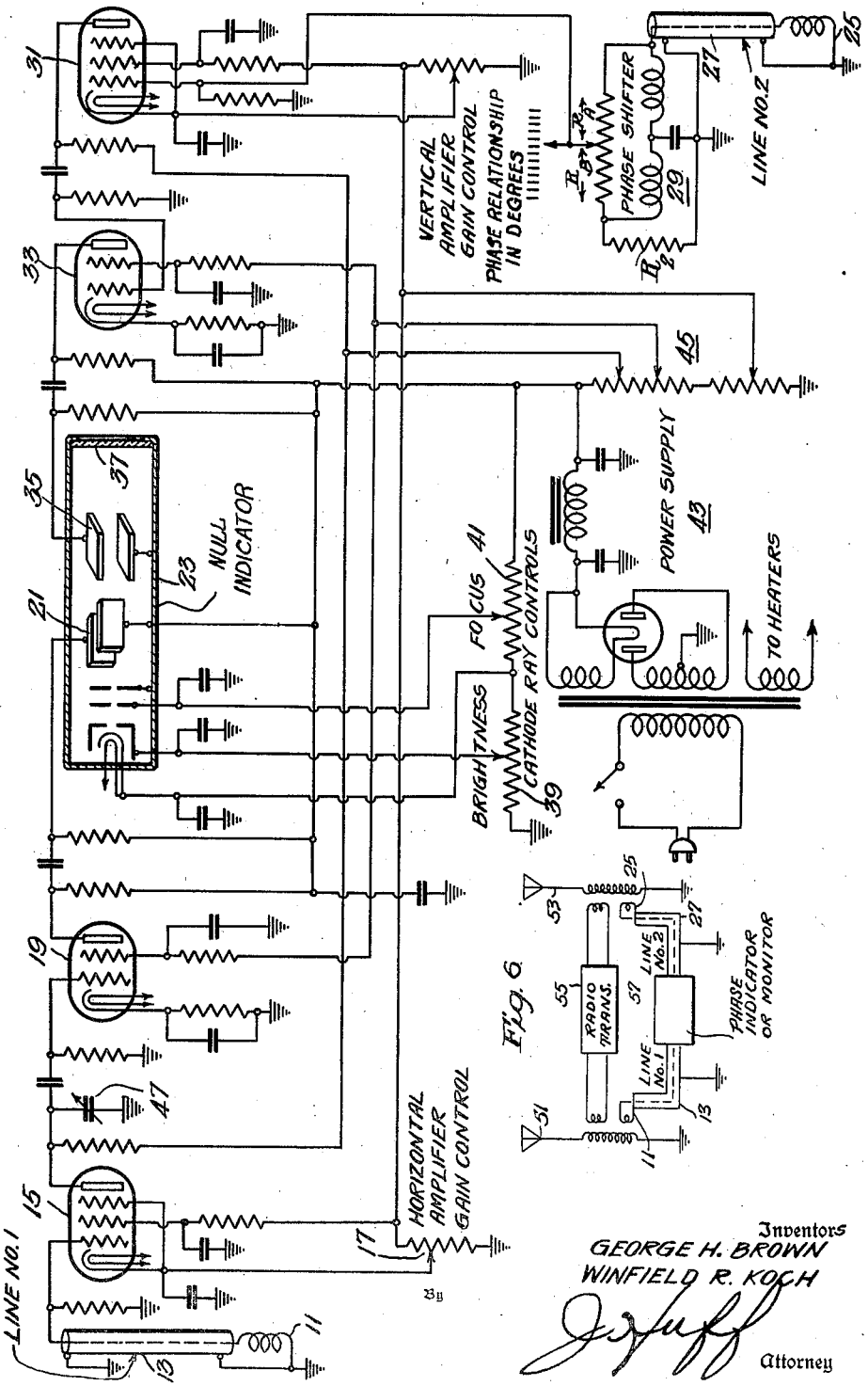

Patented Oct. 17, 1939

2,176,120

UNITED STATES PATENT OFFICE 2,176,120

APPARATUS FOR MEASURING PHASE ANGLES

George H. Brown, Haddonfield, and Winfield R. Koch, Merchantville, N. J., assignors to Radio Corporation of America, a corporation of Delaware Application March 19, 1937, Serial No. 131,838

7 Claims. (Cl. 172—245)

Our invention relates to an apparatus for measuring phase angle. More particularly, our invention relates to an apparatus employing a cathode ray tube for determining the phase angle between alternating currents. Our invention is particularly adapted for measuring the phase angle between the currents in the elements of a directional antenna array.

We are aware of instruments employing cathode ray tubes for measuring phase angles. In the conventional instrument of this type, phase angle may be measured by observing the pattern of the cathode ray on its screen. Variations in the pattern indicate the phase angle. For example, a straight line may indicate currents which are in phase, or 180° out of phase. The direction of the slope of the line will indicate whether the current is an in-phase or 180° out-of-phase current. As the phase begins to shift from zero displacement, the cathode ray trace will become elliptical and finally circular. The circular pattern indicates a 90° phase shift. It will be appreciated that the precise phase angle is not easily determined from the geometric pattern. Variations in the manufacture of the cathode ray tubes tend to introduce further errors. We propose to overcome these difficulties by using the cathode ray tube as a null indicator.

One of the objects of our invention is to use a cathode ray tube as a null indicator in a phase measuring apparatus.

Another object of our invention is to indicate directly the phase shift of one alternating current with respect to another.

A further object of our invention is to measure the phase angle between the currents in elements of a directional antenna array.

Our invention contemplates the use of a cathode ray tube as a null indicator. One of the pairs of deflecting elements of the tube is suitably coupled, preferably through amplifying means, to a source of one of the currents whose phases are to be measured. The other pair of deflecting elements of the cathode ray tube is connected, preferably through amplifying means, to a phase shifting network, which is, in turn, connected to the other source of said currents. A suitable element in the phase-shifting network is calibrated whereby the user may adjust the cathode ray tube to a null point and read directly from the calibration of the element the phase angle of the two currents. Inasmuch as a number of networks may be used in our invention, reference will be made to the accompanying drawings in which Figures 1a, 2a, 3a and 4a are phase shifting networks, Figures 1b, 2b, 3b and 4b are vector diagrams showing, respectively, the phase shift in the several phase shifting circuits, Figure 5 shows the circuit diagram of one embodiment of our invention, and Figure 6 illustrates how the device of Fig. 5 is used to measure or monitor the phase of currents in two antennas of an array.

Referring to Fig. 1a, a transmission line 1, which is preferably a concentric line, is connected to ground and through a series circuit comprising an adjustable resistor $R_1$, an adjustable inductor $L_1$ and an adjustable capacitor $C_1$. This series circuit is connected to a second series circuit comprising an adjustable inductor $L_2$ and an adjustable capacitor $C_2$ and an adjustable resistor $R_2$. One terminal of the resistor $R_2$ is grounded as shown. The output circuit is represented between the terminal 3 and ground 5. By adjusting the reactance of the elements of the output circuit, the phase of the output current may be shifted with respect to the phase of the input current. To prevent reflections in the line 1 it is necessary to terminate the line in its characteristic impedance. Such adjustment may be effected by varying the value of the terminating resistance. Inasmuch as a change in $L_2$ or $C_2$ will present a reactive component to the line, it is necessary to compensate by an adjustment of $L_1$ or $C_1$ to balance out the reactive component which would otherwise affect the characteristics of the transmission line. A vector diagram illustrating the phase shifting characteristics of the circuit of Fig. 1a is shown in Fig. 1b.

Fig. 2a illustrates a phase shifting network less complicated than the arrangement of Fig. 1a. In the simplified circuit of Fig. 2a, the transmission line 1 is serially connected through a variable resistor $R_1$, variable inductor $L_2$, a second variable resistor $R_2$, and a variable capacitor $C_2$ to ground 5. A relatively high resistance potentiometer $R_3$ is shunted across the variable inductor $L_2$ and the variable resistance $R_2$. The variable elements are adjusted to terminate the transmission line 1 in its characteristic impedance to avoid reflections in the line and the adjustable reactors are adjusted to balance out the reactive component in the line and to provide the desired phase shift. In the present circuit, if $R_1$=zero, and $R_2$=$X_L$=$X_C$=$Z_0$, a resistance equal to the characteristic impedance of the line will be presented to the line. Since the voltage across the capacitor $C_2$ will be 90° out of phase with respect to the voltage across the transmission line and since the potentiometer is connected between the line and the capacitor C₂, it will be seen that the phase may be shifted 90°, when the adjustable arm of the potentiometer R₃ is connected to its lower end. The phase shift will be 0° when the adjustable arm of the potentiometer is connected to its upper end. For intermediate positions, the phase shift will fall between 0° and 90°. A vector diagram of these conditions is shown in Fig. 2b.

In Fig. 3a, we have illustrated a phase shifting network which comprises an artificial quarter wave line. The line consists of series inductance L₂, a shunt capacitor C₂, and a terminating impedance R₂. This quarter wave line is connected to the transmission line 1 through a variable resistor R₁. The phase shift in the quarter wave line will be 90°. By connecting a potentiometer R₃ across the inductance L₂, the phase may be shifted by moving the potentiometer arm. When the adjustable arm of R₃ is in the extreme left position, the phase shift will be 0°. When the arm is in the extreme right position, the phase shift will be 90°. The vector diagram, Fig. 3b, represents the characteristics of the circuit of Fig. 3a.

While this circuit is shown as a T section, it should be understood that a π section may be used. Likewise, if an opposite phase shift is desired, a network comprising series capacitors and shunt inductors may be used. If a high impedance line is employed, instead of adjusting R₂ and the inductors L₂ and capacitor C₂, the resistor R₁ may be adjusted to properly terminate the line.

Fig. 4a represents a phase shifting network in which the potentiometer R₃ may be used to shift the phase from minus 45° to plus 45°. In this circuit $X_C = X_L = R = Z_0$. The potentiometer R₃ preferably has a high value of resistance. Fig. 4a represents a circuit which is particularly suitable where the two currents are nearly in phase or nearly out of phase because of the convenience with which the phase angle may be shifted from positive to negative, using a single potentiometer. Fig. 4b represents the vector diagram for the circuit of Fig. 4a.

A suitable circuit for our invention is shown in Fig. 5. A pick-up coil 11 is connected through a suitable transmission line 13 to the input circuit of an amplifier 15. The gain of the amplifier may be controlled by potentiometer 17 or the like. The output of the amplifier 15 is preferably resistance coupled to a second amplifier 19. The output of the second amplifier 19 is coupled through a resistive network to the horizontal deflecting electrodes 21 of cathode ray tube 23.

A second pick-up coil 25 is connected through a transmission line 27. The output of the transmission line 27 is connected to the phase shifting network 29, which corresponds, in the present instance, to Fig. 3a, which has been previously described. The output from the phase shifting network 29 is connected to an amplifier 31, which is preferably of the resistive coupled type. The ouput of the amplifier 31 is impressed upon the input in the second amplifier 33, whose output circuit is coupled through a resistive network to the vertical deflecting e'ectrodes 35 of the cathode ray tube 23. In the present instance, the cathode ray tube 23 is of the metal envelope type with the usual glass end 37, which is suitably coated with fluorescent material. The brightness of the cathode ray trace is controlled by a potentiometer 39 and the focus of the cathode ray is controlled by a second potentiometer 41. The potentiometers 39 and 41 are shunted across any suitable power source, such as the rectifier and filter 43. The same power supply may be used to energize the amplifier tubes 15, 19, 31, 33 and the cathode ray tube 23. The required voltages may be obtained by a potentiometer connection 45.

Fig. 6 shows a directive array comprising a transmitter 55 coupled by suitable means to a pair of antennas 51 and 53. Pick-up coils 11 and 25, which also appear in Fig. 5, are shown coupled to the antennas. The phase indicator or monitor is, for example, the device illustrated in Fig. 5.

Having thus described the circuit of our invention, we shall now refer to its operation. The phase shifting network 29 may be calibrated from the formula

$$\frac{R_a}{R_b} = \tan \theta$$

in which θ = the phase shift in degrees and $R_a$ = the ohmic resistance of one arm of the potentiometer, while $R_b$ = the ohmic resistance of the other arm of the potentiometer. The ohmic resistance of the line matching resistor R₂ should be serially included with $R_b$ of the potentiometer when the calibration is made. This calibration is sufficiently accurate for most practical purposes. We have checked the calibration by applying currents which have been shifted through known phase angles by means of electrical lines whose phase delay in electrical degrees have been previously determined.

After the potentiometer has been calibrated, we find it desirable to check the in-phase condition of the cathode ray tube and its associated amplifiers by connecting the input circuits to a common source with the phase shifting network 29 temporarily disconnected. If there is no phase shift in the amplifiers, the cathode ray trace on the screen 37 will be a straight line, which takes an angle of 45° with respect to the plane parallel to the deflecting elements 35. Inasmuch as the amplifiers may have some slight phase shift, we have found it desirable to employ a variable capacitor 47 which enables the user to adjust the phase shift of one of the amplifiers until the two amplifiers are the same. Under these conditions, the cathode ray trace will be a straight line, while phase shift in either amplifier is indicated by an elliptical trace. The input connection of the two amplifiers is then restored to the normal condition shown in the diagram of Fig. 5. If currents are now impressed on the pick-up coils 11 and 25, these currents will be amplified. The amplified currents will deflect the cathode ray which will indicate phase shift by an elliptical trace. If the potentiometer of the phase shifter 29 is carefully adjusted, the phase shift can be altered until the effect of the two currents on the cathode ray indicates 0° or 180° phase shift. The amount of phase shifting which is required to obtain this indication is the difference in phase angle between the currents which have been impressed upon the pick-up coils 11, 25. This angle may be determined directly from the calibration previously made.

When our invention is applied to the measurement of the phase angle between currents in the elements 51, 53 of the directional antenna array, in the manner illustrated in Fig. 6, we have found certain precautions should be observed. We prefer to make the transmission lines 13, 27, which respectively couple antennas 51, 53 to the indicator of the same length to avoid any inequality of phase delay in the lines themselves. We have also found it desirable to use a shielded concentric line to avoid line pick-up from the currents radiated by the antenna elements. If twisted conductors are used, some pick-up may be experienced which can be eliminated by carefully balancing the line. While we prefer to use lines of equal length, the characteristics of lines of unequal length may be measured to determine the velocity of propagation which may be used to correct for the difference in phase delay over two unequal lines.

Thus, we have described the apparatus for measuring phase angle of two currents by shifting the phase angle of one of the currents until the resultant current is exactly in phase or 180° out of phase, as indicated by the trace on a cathode ray tube. Using this means, a small departure from the in-phase or 180° condition is readily indicated by the resulting elliptical trace of the cathode ray. When the in-phase condition is obtained, the phase angle is directly indicated by the amount by which the phase of one of the currents had to be changed in order to become in phase with the other current. The foregoing means utilizing essentially a null method is not only well adapted to accurately measuring phase angle, but the system may be used to monitor the currents in a directional antenna array.

We claim as our invention:

1. A phase angle measuring device including a cathode ray tube having a pair of deflecting means which when energized by two in phase currents give a straight line deflection of said cathode ray, means for impressing two currents whose phase is to be measured upon said respective deflecting means, a phase shifting network comprising a circuit resonant at the frequency of said currents, and a potentiometer connected across said resonant circuit, said circuit being connected between one of said current impressing means and said deflecting means for shifting the phase of one of said currents to obtain said straight line indication, and means including said potentiometer for indicating the angle of said phase shift which gives said straight line indication from currents out of phase at their source.

2. A phase angle measuring apparatus including in combination a cathode ray tube, a pair of cathode ray deflecting means which give a substantially straight line indication when energized by two in phase currents, means for impressing two currents on said respective deflecting means, said means including a phase shifting network which is resonant at the frequency of said currents and which alters the phase of one of the currents to be measured substantially 90°, and a potentiometer connected across said network, whereby said one of said currents may be shifted a desired amount to obtain said in phase indication, and means for determining the said phase shift in degrees from the ratio of said potentiometer arms.

3. A device for measuring the relative phase angle of two radio frequency currents which comprises means for applying said currents to said device, means for indicating a predetermined phase relation between said currents, and a phase shifter connected to said coupling means for shifting the phase of one of said currents a known amount to obtain said predetermined relation, said phase shifter comprising an inductor and a capacitor of such values and so connected that a non-reactive impedance is presented to said coupling means.

4. A device for measuring the relative phase angle of two radio frequency currents which comprises means for applying each of said currents to said device, means for indicating a predetermined phase relation between said currents, and means for shifting the phase of one of said currents a known amount to obtain said predetermined relation, said last named means comprising a circuit resonant at the frequency of said currents, and a potentiometer connected across said resonant circuit.

5. In a device of the character described, means for indicating a predetermined phase relation between two currents, independent means for applying two currents whose phase is to be measured to said indicating means, means for equalizing the inherent phase shift produced on said currents by said coupling means, one of said coupling means including a resonant circuit for shifting the phase of one of said currents through a range of determinable angles to obtain said predetermined phase indication.

6. A phase angle measuring apparatus including means for indicating an in phase relation of two alternating currents; means for correcting any initial phase shift in said indicating means, a phase shifting circuit; means including a potentiometer connected across said phase shifting circuit for adjusting the phase of one of the two currents whose phase is to be measured to obtain said in phase condition, and means including said potentiometer for indicating the angle of said phase shift in degrees.

7. A phase angle measuring device including in combination a cathode ray tube, a pair of cathode ray deflecting means which give a substantially straight line indication when energized by two in phase currents, coupling means for applying two currents whose phase is to be measured to respective deflecting means, a variable phase-shifting device connected in one of said coupling means, said phase-shifting device presenting a non-reactive impedance to said coupling means, means for equalizing the inherent phase shift of said coupling means when said phase-shifting means is in its zero phase-shift position, and means for determining the angle by which one of said currents must be shifted in order to obtain said in-phase indication.

GEORGE H. BROWN.
WINFIELD R. KOCH.